(12) United States Patent
Lvov et al.

(10) Patent No.: US 11,521,061 B2
(45) Date of Patent: Dec. 6, 2022

(54) DISTRIBUTED PROCESSING OF SENSED INFORMATION

(71) Applicant: DSP GROUP LTD., Herzliya (IL)

(72) Inventors: Dmitri Lvov, Ramat Hasharon (IL); Lior Blanka, Rosh Haayin (IL); Yaron Naim, Herzeliya (IL)

(73) Assignee: DSP GROUP LTD., Herzliya (IL)

( * ) Notice: Subject to any disclaimer, the term of this patent is extended or adjusted under 35 U.S.C. 154(b) by 616 days.

(21) Appl. No.: 16/693,459

(22) Filed: Nov. 25, 2019

(65) Prior Publication Data

US 2020/0167651 A1 May 28, 2020

Related U.S. Application Data

(60) Provisional application No. 62/771,614, filed on Nov. 27, 2018.

(51) Int. Cl.
*G06N 3/08* (2006.01)
*G06F 9/48* (2006.01)
*G06F 9/50* (2006.01)

(52) U.S. Cl.
CPC ............ *G06N 3/08* (2013.01); *G06F 9/4856* (2013.01); *G06F 9/5055* (2013.01); *G06F 9/5066* (2013.01); *G06F 2209/509* (2013.01); *G06F 2209/5017* (2013.01)

(58) Field of Classification Search
None
See application file for complete search history.

(56) References Cited

U.S. PATENT DOCUMENTS

| 2018/0373980 A1* | 12/2018 | Huval ..................... G06N 3/08 |
| 2019/0279011 A1* | 9/2019 | Kshirsagar ........... G06V 40/164 |
| 2020/0184336 A1* | 6/2020 | Cao ...................... G06K 9/6232 |

* cited by examiner

*Primary Examiner* — Craig C Dorais
(74) *Attorney, Agent, or Firm* — Paradice & Li LLP

(57) ABSTRACT

A method for distributed neural network processing, the method may include detecting, by a local neural network that belongs to a local device, and based on sensed information, an occurrence of a triggering event for executing or completing a classification or detection process; sending to a remote device, a request for executing or completing the classification or detection process by a remote device that comprises a remote neural network; wherein the remote neural network has more computational resources than the local neural network; determining by the remote device whether to accept the request; and executing or completing, by the remote device, the classification or detection process when determining to accept the request; wherein the executing or completing involves utilizing the remote neural network.

20 Claims, 4 Drawing Sheets

DISTRIBUTED PROCESSING OF SENSED INFORMATION

CROSS-REFERENCE

This application claims priority from U.S. provisional patent 62/771,614 filing date Nov. 27, 2018.

BACKGROUND

Many applications today require detections and/or classification (hereinafter "detection/classification") of different things. The detection/classification is based on sensed information such as but not limited to images of objects, sound/acoustic events, biometric patterns, etc.

Current solutions rely on processing in the cloud, which imply relatively high latency, violate privacy, and charge a big price for the cloud machines purchase and maintenance.

Another approach in running the classification on edge devices (consumer device). However, this is usually limited to detecting a small number of classes.

There is a growing need to provide a system, method and a non-transitory computer readable medium for processing sensed signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

SUMMARY

Figure 1:
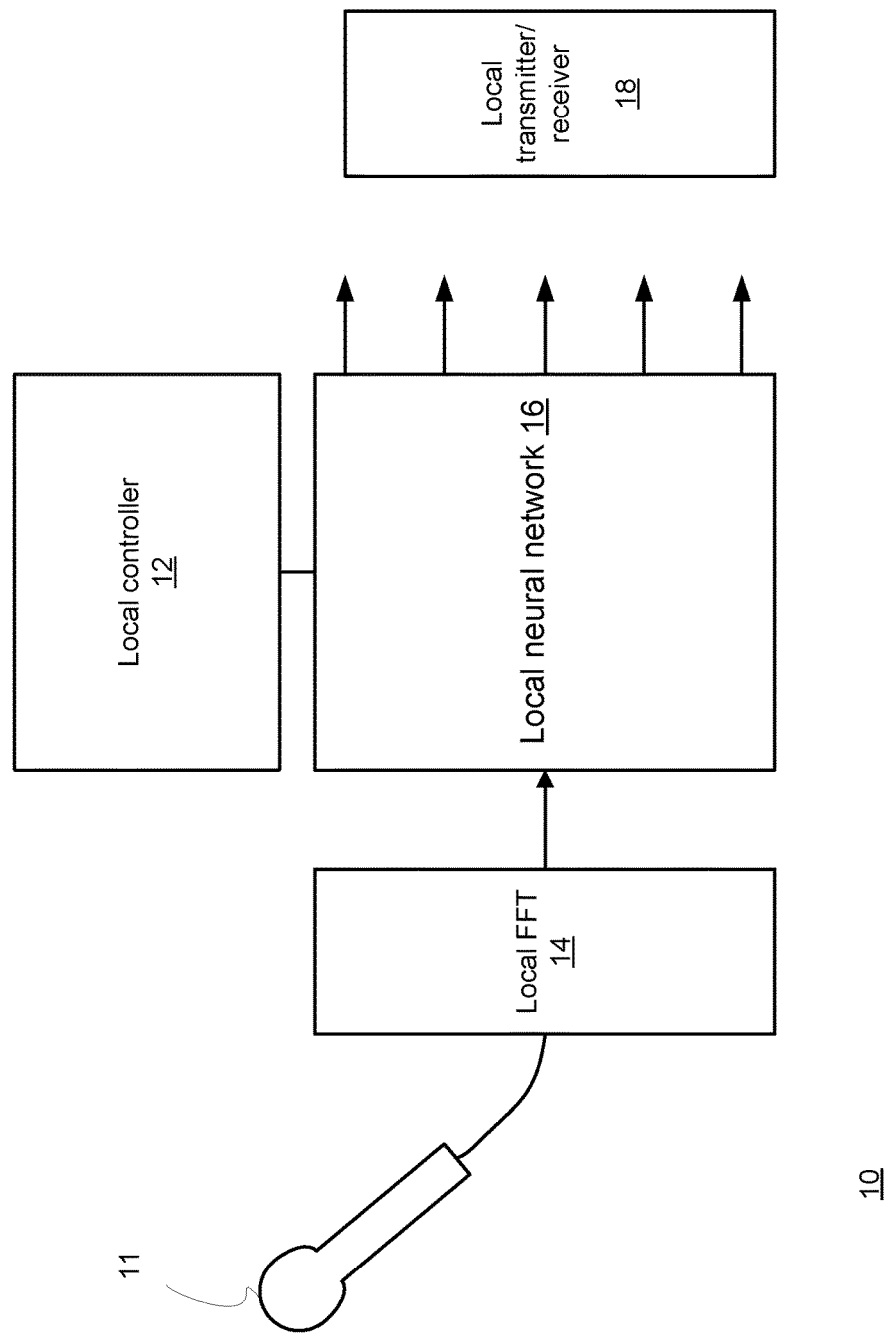
FIG. 1 illustrates an example of a local device.

There may be provided a method for distributed neural network processing, the method may include
detecting, by a local neural network that belongs to a local device, and based on sensed information, an occurrence of a triggering event for executing or completing a classification or detection process; sending to a remote device, a request for executing or completing the classification or detection process by a remote device that comprises a remote neural network; wherein the remote neural network has more computational resources than the local neural network; determining by the remote device whether to accept the request; and executing or completing, by the remote device, the classification or detection process when determining to accept the request; wherein the executing or completing involves utilizing the remote neural network.

The request may include the sensed information.

The method may include preventing from sending the sensed information to the remote device and sending to the remote device at least one out of parameters, characters, and qualities of the sensed information that do not enable a full reconstruction of the sensed information.

The method may include performing a partial classification or detection process by the local device and completing the classification or detection process by the remote device.

The performing of the partial classification or detection may include performing an initial classification by the local device and completing the classification by the remote device to provide a classification result that more accurate than the initial classification.

The initial classification may include classifying sensed information to a certain group of classes; wherein the completing the classification by the remote device may include determine the class of sensed information out of the certain group of classes.

The performing of the partial classification or detection may include performing an initial detection by the local device and completing the detection by the remote device to provide a detection result that more accurate than the initial detection.

The initial detection may include detecting an occurrence of an event out of a certain group of events; wherein the completing the detection by the remote device may include determine the event out of the certain group of events.

The request may be associated with a certain amount of sensed information; wherein the method may include requesting, by the remote device and from the remote device, additional sensed information.

The request may be associated with sensed information that may be suspected to represent an audio trigger for triggering the classification or detection process; wherein the executing or completing of the classification or detection process may include validating the audio trigger by the remote device; and proceeding with the classification process only when validating the audio trigger.

The processing may include requesting additional sensed information from the local device.

The method may include configuring the local neural network based on a representation of the sensed information that was sensed by one or more devices that differ from the local device.

The one or more devices may be positioned in vicinity of the local device.

The method may include configuring the local neural network based on a representation of the sensed information that was sent from the local device.

There may be provided at least one non-transitory computer readable medium may store instructions for: detecting, by a local neural network that belongs to a local device, and based on sensed information, an occurrence of a triggering event for executing or completing a classification or detection process; sending to a remote device, a request for executing or completing the classification or detection process by a remote device that may include a remote neural network; wherein the remote neural network has more computational resources than the local neural network; determining by the remote device whether to accept the request; and executing or completing, by the remote device, the classification or detection process when determining to accept the request; wherein the executing or completing involves utilizing the remote neural network.

The least one non-transitory computer readable medium may store instructions for preventing from sending the sensed information to the remote device and sending to the remote device at least one out of parameters, characters, and qualities of the sensed information that do not enable a full reconstruction of the sensed information.

The least one non-transitory computer readable medium may store instructions for performing a partial classification or detection process by the local device and completing the classification or detection process by the remote device.

The performing of the partial classification or detection may include performing an initial classification by the local device and completing the classification by the remote device to provide a classification result that more accurate than the initial classification.

The initial classification may include classifying sensed information to a certain group of classes; wherein the completing the classification by the remote device may include determine the class of sensed information out of the certain group of classes.

The performing of the partial classification or detection may include performing an initial detection by the local device and completing the detection by the remote device to provide a detection result that more accurate than the initial detection.

The initial detection may include detecting an occurrence of an event out of a certain group of events; wherein the completing the detection by the remote device may include determine the event out of the certain group of events.

The request may be associated with a certain amount of sensed information; wherein the least one non-transitory computer readable medium may store instructions for requesting, by the remote device and from the remote device, additional sensed information.

The request may be associated with sensed information that may be suspected to represent an audio trigger for triggering the classification or detection process; wherein the executing or completing of the classification or detection process may include validating the audio trigger by the remote device; and proceeding with the classification process only when validating the audio trigger.

The processing may include requesting additional sensed information from the local device.

The least one non-transitory computer readable medium may store instructions for configuring the local neural network based on a representation of the sensed information that was sensed by one or more devices that differ from the local device.

The one or more devices may be positioned in vicinity of the local device.

The least one non-transitory computer readable medium may store instructions for configuring the local neural network based on a representation of the sensed information that was sent from the local device.

There may be provided a system that may include a local device that may include a local neural network, and a transmitter; wherein the local neural network may be configured to detect, based on sensed information, an occurrence of a triggering event for executing or completing a classification or detection process; wherein the transmitted may be configured to send to a remote device, a request for executing or completing the classification or detection process by a remote device that may include a remote neural network; wherein the remote neural network has more computational resources than the local neural network;

The system may include the remote device; wherein the remote device may be configured to execute or complete the classification or detection process when determining to accept the request; wherein the executing or completing involves utilizing the remote neural network.

The local device may be configured to prevent from sending the sensed information to the remote device and sending to the remote device at least one out of parameters, characters, and qualities of the sensed information that do not enable a full reconstruction of the sensed information.

The local device may be configured to perform a partial classification or detection process and the remote device may be configured to complete the classification or detection process.

The performing of the partial classification or detection may include performing an initial classification by the local device and a completing the classification by the remote device may provide a classification result that more accurate than the initial classification.

The initial classification may include classifying sensed information to a certain group of classes; wherein the completing the classification by the remote device may include determine the class of sensed information out of the certain group of classes.

The performing of the partial classification or detection may include performing an initial detection by the local device and completing the detection by the remote device to provide a detection result that more accurate than the initial detection.

The initial detection may include detecting an occurrence of an event out of a certain group of events; wherein the completing the detection by the remote device may include determine the event out of the certain group of events.

The request may be associated with a certain amount of sensed information; wherein the system may be configured to requesting, by the remote device and from the remote device, additional sensed information.

The request may be associated with sensed information that may be suspected to represent an audio trigger for triggering the classification or detection process; wherein the executing or completing of the classification or detection process may include validating the audio trigger by the remote device; and proceeding with the classification process only when validating the audio trigger.

The processing may include requesting additional sensed information from the local device.

The system may be configured to configuring the local neural network based on a representation of the sensed information that was sensed by one or more devices that differ from the local device.

The one or more devices may be positioned in vicinity of the local device.

The system may be configured to configuring the local neural network based on a representation of the sensed information that was sent from the local device

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and/or should be applied mutatis mutandis to a non-transitory computer readable medium that stores instructions for executing the method.

Any reference in the specification to a system should be applied mutatis mutandis to a method that may be executed by the system and to a non-transitory computer readable medium that stores instructions executable by the system.

The terms "device" and "system" are used in an interchangeable manner.

The terms "control", "reconfigure" and "manage" are used in an interchangeable manner.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

There may be provided a system, a method, and non-transitory computer readable medium for distributed processing of sensed information.

A local device (such as an edge device or any IoT device) may include:
  a. One or more sensors and/or interfaces for sensing and/or receiving sensed information.
  b. One or more local neural networks for detecting a triggering event that merits the sending of the sensed information to a remote system (such as a cloud neural network or a cloud computer) to be processed by the remote system.
  c. A communication module for at least partially assisting in the transmission of the sensed information and/or a trigger for triggering the processing by the remote device.
  d. A controller for controlling the operation of the local device.

The local device (or any other entity) may determine when to transmit the sensed information and/or which sensed information to transmit (for example—raw or processed sensed information). The determination may be based on one or more parameters such as priority, available transmission and/or storage resources, privacy issues (for example raw signals sensed by a sensor may not be sent over the cloud for privacy reasons), and the like.

The local device can determine the triggering event but at a lower accuracy and/or lower classification resolution than the remote system. For example—the local device may detect a sound generated by an electrical device without determining the type of the electrical device and/or determine the type of the electrical device at a low certainty level.

The remote system may or may not control and/or reconfigure and/or manage the local device. For example—the remote device may program the one or more local neural network. The programming may include at least one out of setting one or more weights, setting a connectivity between neural cells of the one or more local neural network, determining the architecture (type) of the neural network, and the like.

In a sense the local device performs a type of preprocessing of the sensed information and determines when to trigger the remote device to process the sensed information—which dramatically reduces the communication volume between the local device and remote system, reduces the computational load and/or the storage load imposed on the remote system, reduces the power consumption of the local device and of the remote system, speeds up the response of the remote system, and reduces the memory resources imposed on the local device.

FIG. 1 illustrates an example of a local device.

The local device 10 is illustrates as including:
  a. A local controller 12 for controlling the local device.
  b. A sensor such as microphone 11 for providing sensed information.
  c. A local preprocessing stage such as a local fast Fourier transform (FFT) unit 14 for converting the sensed information from the time domain to the frequency domain.
  d. A local neural network 16 for processing the frequency transformed sensed information to detect an occurrence of a triggering event for executing or completing a classification or detection process.
  e. A local transmitter/receiver 18.

FIG. 1 is merely a non-limiting example of a local device. The local device may have one or more sensors that differ from a microphone, may receive the sensed information from another local device and not sense it by itself, the local neural network may be preceded by other/additional local preprocessing circuits, the outputs of the local neural network may be further processed by an additional processing module (not shown), and the like. The local transmitter/receiver may transmit and receive using any communication protocol—wired, wireless, and the like.

The local controller 12 may be configured (constructed and arranged—for example programmed) to execute instruction stored in a local non-transitory computer readable medium.

Figure 2:
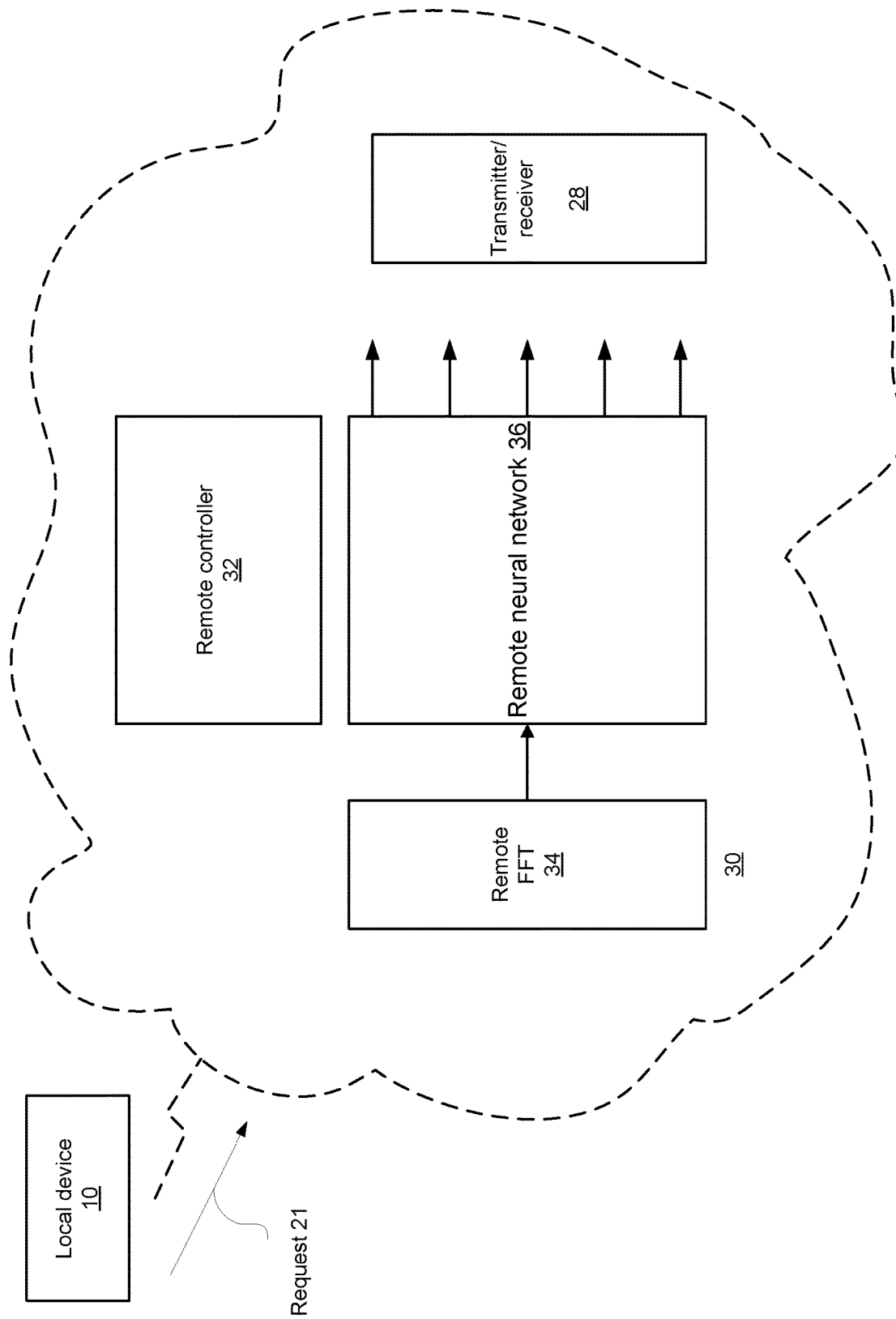
FIG. 2 illustrates an example of a system and its environment, the system includes a local device and a remote system.
Figure 3:
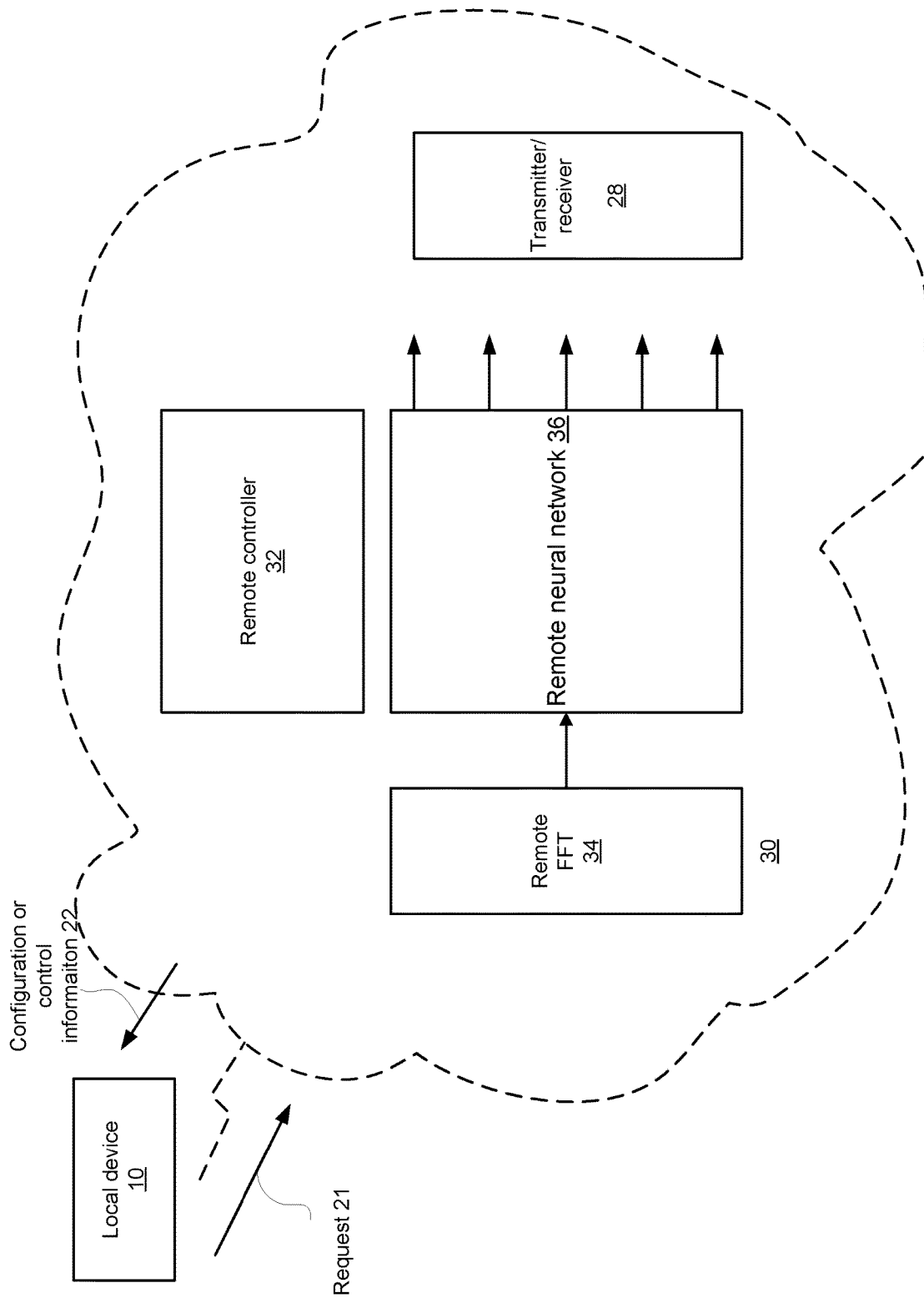
FIG. 3 illustrates an example of a system and its environment, the system includes a local device and a remote system.

FIGS. 2 and 3 illustrate examples of a system and its environment, the system includes a local device and a remote system.

The remote device 20 may be within a cloud computing environment or may receive and/or send information from and to the local device in any manner. The remote device may be coupled to multiple local devices.

The remote device 30 is illustrates as including:
  a. A Remote controller 32 for controlling the remote device.
  b. A remote preprocessing stage such as a remote fast Fourier transform (FFT) unit 34 for converting the sensed information (or representation of sensed information from the local device) from the time domain to the frequency domain.
  c. A remote neural network 36 for processing the frequency transformed sensed information to detect an occurrence of a triggering event for executing or completing a classification or detection process.
  d. A remote transmitter/receiver 38.

This is merely a non-limiting example of a remote device. The remote neural network may be preceded by other/additional remote preprocessing circuits, the outputs of the remote neural network may be further processed by an additional processing module (not shown), and the like. The remote transmitter/receiver may transmit and receive using any communication protocol—wired, wireless, and the like.

The remote controller 22 may be configured (constructed and arranged—for example programmed) to execute instruction stored in a remote non-transitory computer readable medium FIG. 2 illustrates a request 21 sent to the remote device.

FIG. 3 differs from FIG. 2 by adding feedback (such as configuration or control information 22) from the remote system to the local device.

In the following examples the local device is an edge device, the remote system is a could system (such as a server or any other cloud system) and the sensed information related to one or more classes of audio (for example—four classes—audio generated by a tap,—audio generated by a coffee machine,—audio generated by a microwave, or—audio generated by a mixer).

In this example, there is provided a method that includes:
a. Detecting, by an edge device, a class (audio origin) out of a group of classes—with low accuracy. The low accuracy may mean a significant false alarm percentage—without rejecting may true triggering events.
b. Triggering the remote system which detect the class with higher accuracy.

This scheme reduced the load on the cloud servers, while maintaining the high accuracy of the cloud servers.

In this example, there is provided a method that includes:
a. Detecting, by an edge device, a group of classes—without distinguishing between the members of the group.
b. Triggering the remote system which detect the class with high accuracy.

The remote system may include a "high performance DNN" which detects the exact class with a higher accuracy and may update the local DNN.

The benefit from this scheme is reducing the load on the cloud servers, while controlling and update the edge by using the cloud higher performance capabilities.

The remote system may reconfigure the local device in at least one the following manners
a. Perform the reconfiguration based on sensed information obtained from the user associated with the local device.
b. Perform the reconfiguration based on sensed information obtained from the local device.
c. Perform the reconfiguration based on sensed information obtained from a building/house/apartment/vicinity of the local device.
d. Perform the reconfiguration based on sensed information that is not collected by or not associated with at least one of the user, not collected by or not associated with the local device, and/or not collected by or not associated with the any one of building/house/apartment/vicinity of the local dev on any combination of (a), (b), and (c).
e. Perform the reconfiguration based on any combination of (a), (b), (c) and (d).
f. Perform the configuration such as to personalize the configuration per user and/or per local device.
g. Select (automatically) a suitable edge network structure.

The remote system may select the type of sensed information is receives—for example requesting raw sensed information when the false alarm associated with the triggers is high—exceeds a predefined error rate threshold.

The remote system may perform any traffic management for controlling the traffic with the local device.

The remote system may perform automatic annotation of sensed information. The annotation may include adding metadata that may be used during a supervised training of the one or more local neural networks.

Sending to the one or more local neural networks additional information (not sensed by the local device)—wherein the one or more local neural networks are configured (either in control of the remote system or not) to take into account the additional information.

The additional information may include information sensed by one or more sensors not belonging to the local device, sensed information not previously available to the local device.

The additional information may include information from the web—such as weather forecast The remote system may perform automatic quality control on the outputs (for example triggers) from the local device.

Figure 4:
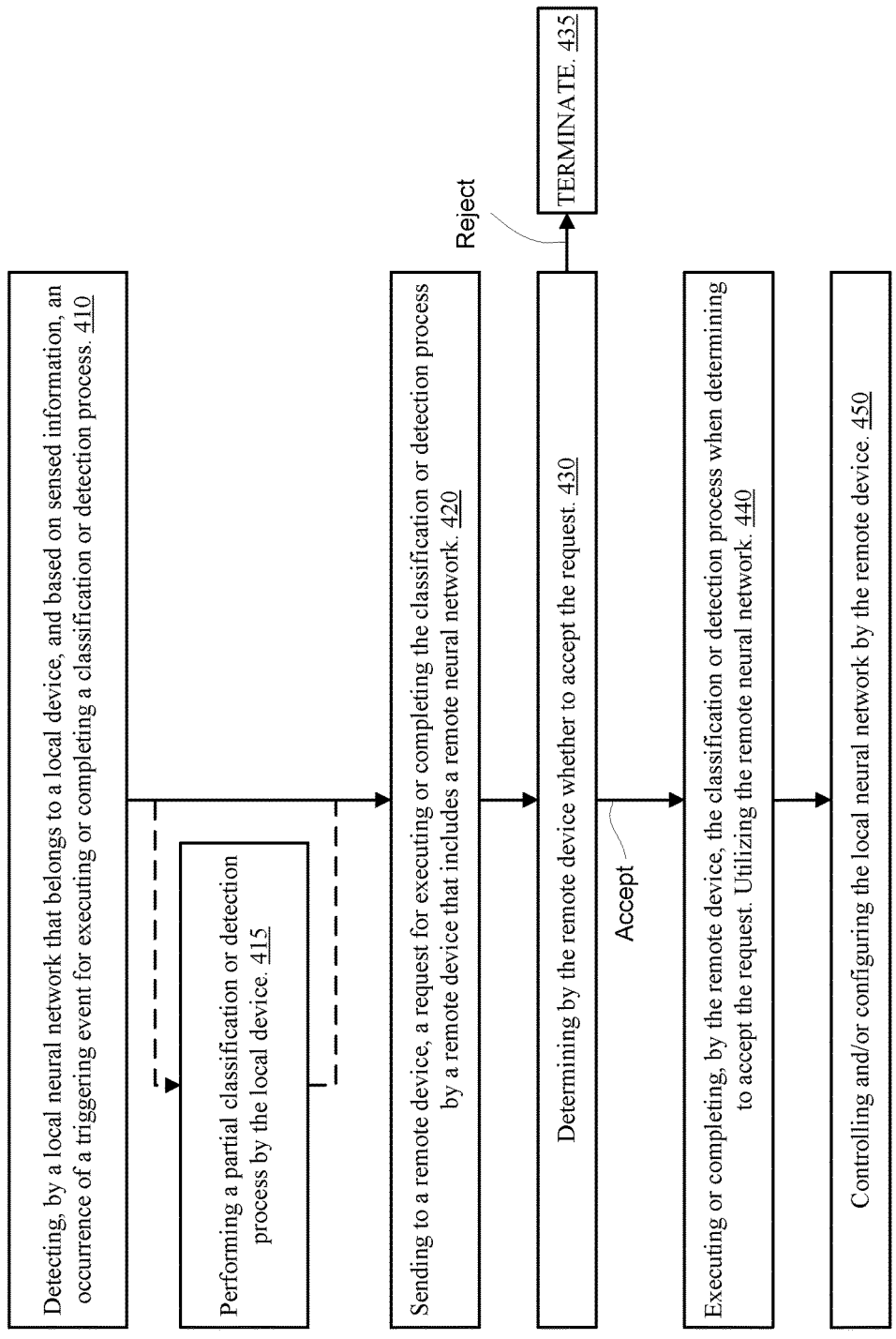
FIG. 4 illustrates an example of a method.

FIG. 4 illustrates an example of method 400 for distributed neural network processing.

Method 400 may start by step 410 of detecting, by a local neural network that belongs to a local device, and based on sensed information, an occurrence of a triggering event for executing or completing a classification or detection process.

The sensed information may be sensed by the local device or by one or more other devices. The sensed information may be local sensed information in the sense that is sensed by a sensor located in vicinity of the local device—for example within less than few tens of meters by the local device, within the building of the local device, and the like. The term local may mean that the distance between the sensor that sensed the sensed information and the local device is smaller (even much smaller) than the distance between the sensor and a remote device. The remote device may be located, for example, within more than 1, 10, 100, 1000, 10000 kilometers from the local device.

The sensed information may be audio information or another type of information (for example visual, vibrational, and the like).

Step 410 may be followed by step 415 of performing a partial classification or detection process by the local device. Step 415 may be followed by step 420.

Step 410 may be followed by step 420 of sending to a remote device, a request for executing or completing the classification or detection process by a remote device that includes a remote neural network.

The remote neural network has more computational resources (for example more nodes, more connection between nodes) than the local neural network.

The local device may perform a partial processing. In this case the remote device may be requested to complete the process or may be requested to execute the entire processing (regardless of the partial processing or based on the outcome of the partial processing).

The request may be associated with sensed information or with a representation of the sensed information that differs from the sensed information. The representation may or may not enable to fully reconstruct the sensed information. The local device may be prevented from sending at least one out of parameters, characters, and qualities of the sensed information that enable a full reconstruction of the sensed information.

The representation may include, for example, at least one out of parameters, characters, and qualities of the sensed information.

The association means that the sensed information or the representation of the sensed information may be a part of the request or may not be a part of the request but may be linked, tagged, flagged or otherwise indicated that the it is associated with the request.

Step 420 may be followed by step 430 of determining by the remote device whether to accept the request.

The determining may include checking whether the sensed information or with a representation of the sensed information may be processed to extract a triggering event or other sensed information to be used during the processing.

When determining to reject the request the method may be terminated (step 435).

When determining to accept the request then step 430 may be followed by step 440 of executing or completing, by the remote device, the classification or detection process when determining to accept the request. Step 440 involves utilizing the remote neural network.

Step 415 may include performing a partial classification or detection process by the local device and step 440 may include completing the classification or detection process by the remote device.

Step 415 may include performing an initial classification by the local device and step 440 may include completing the classification by the remote device to provide a classification result that more accurate than the initial classification.

Step 415 may include classifying sensed information to a certain group of classes and step 440 may include completing the classification by the remote device by determining the class of sensed information out of the certain group of classes.

Step 415 may include performing of the partial classification or detection comprises performing an initial detection by the local device, and step 440 may include completing the detection by the remote device to provide a detection result that more accurate than the initial detection.

Step 415 may include detecting an occurrence of an event out of a certain group of events, and step 440 may include determining the event out of the certain group of events.

The request is associated with a certain amount of sensed information (or a certain amount of the representation).

Step 440 may include requesting, by the remote device and from the remote device, additional sensed information, receiving the additional sensed information and completing the processing based on the additional sensed information.

The additional sensed information may be sensed at another period from the sensed information (for example—the sensed information includes a voice trigger and the additional sensed information may include a query or command that followed the voice trigger), may include a different types of sensed information, may be sensed by a device other than the device that sensed the sensed information, may be sensed at another location, may be of a higher resolution than the sensed information, may be of a higher sampling rate than the sensed information, may be of a different spectral range than the sensed information, and the like.

In step 420 the request may be associated with sensed information that is suspected to represent an audio trigger for triggering the classification or detection process. Step 440 may include validating the audio trigger by the remote device; and proceeding with the classification process only when validating the audio trigger.

Step 440 may be followed by step 450 of controlling and/or configuring the local neural network by the remote device. The controlling or configuring may occur for any reason stated in the specification.

Step 450 may include sending by the remote device configuration information that is used for configuring the local device.

Step 450 may be based on a representation of the sensed information that was sensed by one or more devices that differ from the local device. The one or more devices may be positioned in vicinity of the local device.

Step 450 may include configuring the local neural network based on a representation of the sensed information that was sent from the local device.

Method 400 may be executed one or more of the steps illustrated anywhere in the specification.

There may be provided at least one non-transitory computer readable medium that store instructions for executing any combination of steps illustrated in the specification. For example the one or more may store instructions for executing the steps of method 400. For example—a first non-transitory computer readable medium may have its instructions accessible to a local device and a second non-transitory computer readable medium may have its instructions accessible to a remote device.

There may be provided a system that may include a local device and may also include the remote device. The system may be configured to execute at least some of the steps of method 400.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for distributed neural network processing, the method comprising:
    detecting, by a local neural network that belongs to a local device, and based on sensed information, an occurrence of a triggering event for executing or completing a classification or detection process;
    sending, to a remote device including a remote neural network, a request for executing or completing the classification or detection process by the remote device, wherein the remote neural network has more computational resources than the local neural network;
    determining, by the remote device, whether to accept the request; and
    executing or completing, by the remote device, the classification or detection process when determining to accept the request, wherein the executing or completing involves utilizing the remote neural network.

2. The method of claim 1, wherein the request includes the sensed information.

3. The method of claim 1, further comprising:
    preventing from sending the sensed information to the remote device; and
    sending, to the remote device, at least one out of parameters, characters, and qualities of the sensed information that do not enable a full reconstruction of the sensed information.

4. The method of claim 1, further comprising:
    performing a partial classification or detection process by the local device; and
    completing the classification or detection process by the remote device.

5. The method of claim 4, wherein the performing of the partial classification or detection process includes performing an initial classification by the local device and completing the classification by the remote device to provide a classification result that is more accurate than the initial classification.

6. The method of claim 5, wherein the initial classification includes classifying the sensed information to a certain group of classes; and wherein the completing the classification by the remote device includes determining a class of the sensed information out of the certain group of classes.

7. The method of claim 4, wherein the performing of the partial classification or detection process includes performing an initial detection by the local device and completing the detection by the remote device to provide a detection result that is more accurate than the initial detection.

8. The method of claim 7, wherein the initial detection includes detecting an occurrence of an event out of a certain group of events; and
    wherein the completing the detection by the remote device includes determining the event out of the certain group of events.

9. The method of claim 1, wherein the request is associated with a certain amount of the sensed information; and wherein the method further comprises:
    requesting, by the remote device and from the local device, additional sensed information.

10. The method of claim 1, wherein the request is associated with sensed information that is suspected to represent an audio trigger for triggering the classification or detection process; and wherein the executing or completing of the classification or detection process includes validating the audio trigger by the remote device, and proceeding with the classification process only when validating the audio trigger.

11. The method of claim 10, wherein the executing or completing of the classification or detection process includes requesting additional sensed information from the local device.

12. The method of claim 1, further comprising: configuring the local neural network based on a representation of the sensed information that was sensed by one or more devices that differ from the local device.

13. The method of claim 12, wherein the one or more devices are positioned in vicinity of the local device.

14. The method of claim 1, further comprising:
    configuring the local neural network based on a representation of the sensed information that was sent from the local device.

15. At least one non-transitory computer readable medium that stores instructions for:
- detecting, by a local neural network that belongs to a local device, and based on sensed information, an occurrence of a triggering event for executing or completing a classification or detection process;
- sending, to a remote device including a remote neural network, a request for executing or completing the classification or detection process by the remote device, wherein the remote neural network has more computational resources than the local neural network;
- determining, by the remote device, whether to accept the request; and
- executing or completing, by the remote device, the classification or detection process when determining to accept the request, wherein the executing or completing involves utilizing the remote neural network.

16. The at least one non-transitory computer readable medium of claim 15, further storing instructions for:
- performing a partial classification or detection process by the local device; and
- completing the classification or detection process by the remote device.

17. The at least one non-transitory computer readable medium of claim 16, wherein the performing of the partial classification or detection includes performing an initial detection by the local device and completing the detection by the remote device to provide a detection result that is more accurate than the initial detection.

18. The at least one non-transitory computer readable medium of claim 15, wherein the request is associated with sensed information that is suspected to represent an audio trigger for triggering the classification or detection process; and wherein the executing or completing of the classification or detection process includes validating the audio trigger by the remote device, and proceeding with the classification process only when validating the audio trigger.

19. A system comprising:
- a local device that includes a local neural network and a transmitter; wherein the local neural network is configured to detect, based on sensed information, an occurrence of a triggering event for executing or completing a classification or detection process; and wherein the transmitter is configured to send, to a remote device including a remote neural network, a request for executing or completing the classification or detection process by the remote device, the remote neural network having more computational resources than the local neural network.

20. The system of claim 19, further comprising the remote device, wherein the remote device is configured to execute or complete the classification or detection process when determining to accept the request, and wherein the executing or completing involves utilizing the remote neural network.

* * * * *